(12) United States Patent
Yao

(10) Patent No.: US 6,534,009 B1
(45) Date of Patent: Mar. 18, 2003

(54) METHOD AND APPARATUS FOR FREQUENCY THERMAL CONTROL

(75) Inventor: Nan-Kuang Yao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 98 days.

(21) Appl. No.: 09/689,895

(22) Filed: Oct. 13, 2000

(51) Int. Cl.⁷ .............................................. G01N 33/48
(52) U.S. Cl. ..................... 422/68.1; 422/81; 435/91.2
(58) Field of Search ...................... 422/99, 68.1, 81; 435/6, 4, 91.2; 138/39; 204/601

(56) References Cited

U.S. PATENT DOCUMENTS

| | | | | |
|---|---|---|---|---|
| 5,720,923 A | * | 2/1998 | Haff et al. ................. 422/68.1 |
| 5,736,314 A | * | 4/1998 | Hayes et al. ..................... 435/4 |
| 5,800,781 A | * | 9/1998 | Gavin et al. ................... 422/73 |
| 6,068,751 A | * | 5/2000 | Neukermans ................ 204/601 |
| 6,132,996 A | * | 10/2000 | Hunicke-Smith ........... 435/91.2 |
| 6,174,675 B1 | * | 1/2001 | Chow et al. ..................... 435/6 |
| 6,192,939 B1 | * | 2/2001 | Yao et al. ....................... 138/39 |
| 6,235,471 B1 | * | 5/2001 | Knapp et al. .................... 435/6 |

* cited by examiner

*Primary Examiner*—Jill Warden
*Assistant Examiner*—Brian Sines
(74) *Attorney, Agent, or Firm*—Bacon & Thomas

(57) ABSTRACT

A method for thermal control of microfluid and a device using the thermal control method utilizes a chip provided with a microchannel and a pneumatic microflow driving element to drive a microfluid back and forth in the microchannel at a predetermined frequency. Heating devices are arranged along specific sections of the microchannel. By controlling the frequency of the back-and-forth movement of the microfluid, the temperature of the microfluid may be accurately controlled. Due to the rapid movement of the microfluid in the microchannel, uniform distribution of the temperature and ingredients in the microfluid may also be obtained.

5 Claims, 1 Drawing Sheet

| Hz | Sensor(11) | Sensor(12) |
|---|---|---|
| 1.00 | 53.15 | 50.59 |
| 1.25 | 53.05 | 51.51 |
| 1.67 | 53.10 | 52.44 |
| 2.50 | 52.99 | 52.99 |
| 5.00 | 53.26 | 53.60 |

METHOD AND APPARATUS FOR FREQUENCY THERMAL CONTROL

FIELD OF INVENTION

The present invention relates to a method and an apparatus for frequency thermal control, especially to a method and an apparatus for controlling the temperature of a microfluid by applying the microfluid to a heater at a determined frequency.

BACKGROUND OF INVENTION

The "polymerase chain reaction (PCR)" is a biochemical reaction invented by Kary Mullis in 1985. This technique enables us to produce enormous numbers of copies of specified DNA sequence. PCR utilizes DNA's double helix structure and base pairing. In PCR, particular base sequences on the order of hundreds of base pairs may be precisely selected from a molecule having millions of base pairs, and duplicated to obtain more than one million copies of such sequences.

In conducting a PCR, three basic steps are necessary:

1. Denature: The double-stranded DNA templates can be separated by heating the reaction mixture to temperatures near boiling.

2. Annealing: While reducing the temperature of the mixture to 30–65, primers anneal to the two primer binding sites that flank the target region, one on each strand.

3. Extension: The temperature of the reaction mixture is again increased to 65–75° C., such that the Taq polymerase synthesizes new strands of DNA, complementary to the template, that extend a variable distance beyond the position of the primer binding site on the other template.

When the above-said three steps are conducted repeatedly, the polymerase chain reaction may be conducted. In theory, when n cycles are completed, $2^n$ amplicons may be obtained. For example, if the steps are repeated 20 times, 268,435,456 double helix amplicons may be obtained. However, in practice, the yield rate may be expected according to the following equation:

Yield=$(1+e)^n$, wherein e represents efficiency. In general case, the efficiency will decrease when more than 20 cycles are conducted, in which the efficiency is about 0.8.

There are two major reasons why the efficiency will decrease. The first reason is mismatch of the primers. Even when the position of the primer matched to the template is wrong, the PCR mechanism continues to produce non-targeted amplicons regardless of the mismatch. The product so obtained is call "ugly little fragment" or "primer dimmer" which competitively consumes the reaction materials in the mixture. The second possible problem affecting the efficiency of the PCR is damage caused to the polymerase by the repeated denature temperature.

The above problems may be solved by two approaches. The first solution is to create accurate and sharp turning points of the thermocycles. In order to avoid damage to the polymerase due to the continuous high denature temperature and mismatches of the primer due to the low temperature during annealing, optimal denaturation and annealing times are less than 1 sec. The second possible solution is to accelerate the increase and decrease of the temperature. The rapid temperature transitions decrease the amount of non-specific product. Rapid cooling after denaturation of the DNA template and primer pairs favors the kinetics of specific primer annealing. Besides, maintaining the mixture in a relatively high temperature would damage the polymerase.

U.S. Pat. No. 5,475,610 related to a thermal cycler. The spirit of this patent rested in the interface between its reaction tube and its temperature programmed sample block The reaction tube used in this patent has a thin wall made of polyethylene, The reaction tubes are first plugged into the wells positioned in a metal block and are sealed with upper heated covers. In this patent, the heat exchange area and efficiency may be enhanced such that the volume to surface ratio of the system may reach 0.66 ul/mm2, whereby each 1 $mm^2$ thermal transmission area can support the heat exchange of 0.66 ul PCR samples. A PCR system according to this invention is able to provide a temperature increase speed of about 5° C./s. However, the physical contact heating process is used in this patent wherein the metal block is first heated such that the wall of the reaction tube may be heated and that the PCR mixture may be heated. As a result, the total thermal mass of the system is so great that rapid temperature variation is not possible in this system.

If one observes from the view point of temperature variation of the PCR system, the variation of temperature during the process may be divided into four steps: heating, cooling, heating and thermostatic. J L Danssaert et al. disclosed a PCR device comprising four temperature-controlling gradient blocks in their U.S. Pat. No. 5,525,300. In the Danssaert et al. invention, the first and third blocks have respective heaters to raise the temperature, the fourth block has a cooler to drop the temperature and the second block has a heater and a cooler to maintain the temperature. During the operation of the PCR system, a robot is used to remove the test tubes from one block to another. As a result, all test tubes may be subject to heating, cooling, heating and thermostatic steps.

The advantages of the Danssaert et al. invention include that the system may have very short transient state, since the temperatures of the four blocks are already settled, and that rapid temperature variations of the reaction mixture is made possible by the mechanical action with a robot. However, the disadvantages of this invention rest in the interface between the test tubes and the temperature controlling blocks. Because it is necessary to remove the test tubes from time to time, it is impossible to provide tight contacts between the test tubes and the blocks. Heat exchange efficiency of the system is thus reduced. In addition to that, the frequent movement of the robot arm makes the reliability of the system relatively low.

Andreas Manz et al. disclosed a continuous-flow PCR system in 1998. See: Kopp M U, de Mello A J, Manz A, Chemical amplification: continuous-flow PCR on a chip, Science, Vol. 280, pp. 1046–1048, 1998. In this continuous-flow PCR system, a single microchannel passes repetitively through three temperature zones. The microchannel with a cross-section area of 40 $\mu$mx90 $\mu$m and a length of 2.2 m is etched in a glass chip with the micromachining technology. The pattern of the chip layout determines the relative time in which a fluid element is exposed to each temperature zone. The glass chip is then positioned on an arrangement of three spatially separated copper blocks, with their temperature maintained stably at 60° C., 77° C. and 95° C. respectively. The PCR reaction mixture is supplied to and pumped through the microchannel such that 20 identical thermal cycles, each having a time ratio of 4:4:9 (denature, annealing, extension) may be achieved.

This continuous-flow system provides an advantageous volume to surface ratio of 0.04 $\mu/mm^2$, about only one seventeenth to that of the conventional PE reaction tube. As a result, when the reactants flow through a copper block, the expanded heat exchange surface enables the temperature of the reactants to reach the same temperature as the surroundings. Another achievement rests in that the continuous "time" in the denature, annealing and extension steps are converted into the accurately defined "space" (the 4:4:9 length proportions) as prepared by the micromachining technology. According to the above-mentioned article, if the flow speed of the reactants is 72.9 µl/s, it takes only 90 seconds to complete 20 cycles. However, such a speed will bring up a new question: the yield of the reaction. According to this article, When the flow speed is 5.8 µl/s, it takes 18.8 minutes to complete 20 cycles and the yield rate could reach about 80% of that of the conventional art. When the flow speed is accelerated, the yield rate will decrease significantly. Obviously when the reaction is completed within 90 seconds, the yield rate should be very low. In addition, as the cycle time ratio of 4:4:9 has been defined by the chip layout, the freedom of adjusting the proportions is thus limited. As a matter of fact, it is always necessary to adjust the cycle time ratio in the practical application of PCR.

It is thus a need in the industry to provide a novel method for thermal control of microfluid that can provide efficient and accurate thermal control.

OBJECTIVES OF THE INVENTION

The objective of this invention is to provide a novel method and device for thermal control of microfluid.

Another objective of this invention is to provide a method and device for frequency thermal control of microfluid.

Another objective of this invention is to provide a method for dynamic, rapid and accurate control of the temperature of a microfluid.

Another objective of this invention is to provide a low-cost device for thermal control of microfluid.

SUMMARY OF INVENTION

According to this invention a method for thermal control of microfluid and a device using the thermal control method are disclosed. The device of this invention comprises a chip provided with a microchannel and a pneumatic microflow driving element to drive a microfluid to flow back and forth in said microchannel at a predetermined frequency. Heating device are arranged along specific sections of the microchannel. By controlling the frequency of the back-and-forth movement of the microfluid, the temperature of the microfluid may be accurately controlled. Due to the rapid movement of the microfluid in the microchannel, uniform distribution of temperature and ingredients in the microfluid may also be obtained.

These and other objectives and advantages of this invention may be understood from the detailed description by referring to the following drawings.

DETAILED DESCRIPTION OF THE INVENTION

Figures 1, 2:
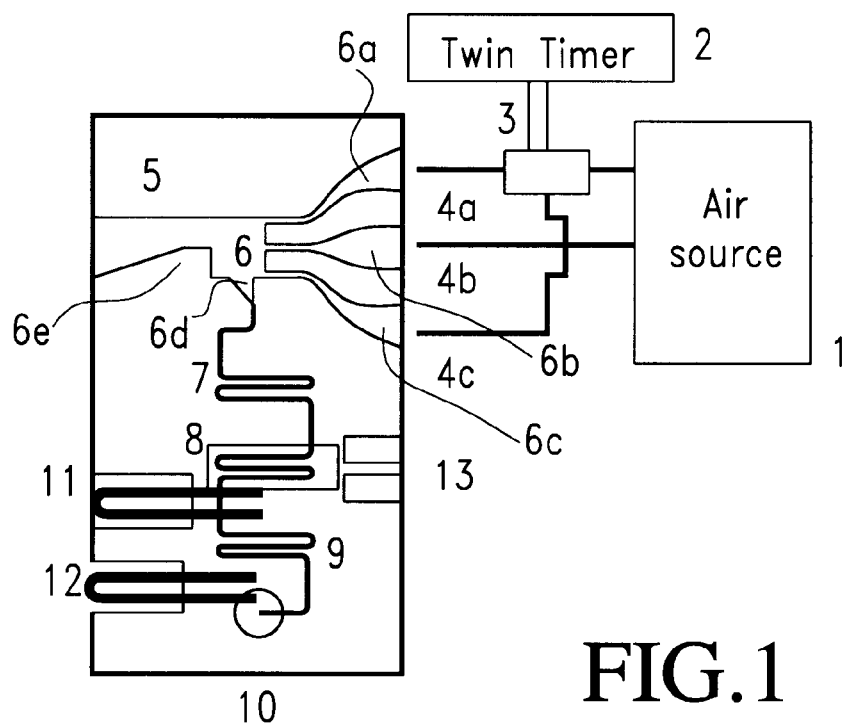
FIG. 1 illustrates the structure of the device for frequency thermal control of microfluid of this invention.
FIG. 2 illustrates the relation between the temperature and the frequency of the back-and-forth movement of the microfluid in the microchannel of the present invention.

The device for frequency thermal control of microfluid of this invention comprises a pneumatic microflow driving element, a microchannel and at least one heating coil positioned in specific sections of said microchannel. FIG. 1 illustrates the structure of the device for frequency thermal control of microfluid of this invention. As shown in this figure, the device for frequency thermal control of this invention may be prepared in a microchip. The device for frequency thermal control of microfluid comprises: a pneumatic microflow driving element which comprises an air compressor 1, a dual frequency timer 2, an electromagnetic valve 3, a group of air jet nozzles 4a, 4b and 4c, and an on-chip air gallery 6; an on-chip microchannel which extends through a buffer area 7, a heating area 8, a temperature sensing area 9 and a reactant inlet 10, and at least one heating coil 13. In addition, temperature sensors 11 and 12 are provided adjacent to the microchannel. this figure, the device for frequency thermal control of this invention may be prepared in a microchip. The device for frequency thermal control of microfluid comprises: a pneumatic microflow driving element which comprises an air compressor 1, a dual frequency timer 2, a electromagnetic valve 3, a group of air jet nuzzles 4a, 4b and 4c, and an on-chip air gallery 6; an on-chip microchannel which extends through a buffer area 7, a heating area 8, a temperature sensing area 9 and a reactant inlet 10; and at least one heating coil 13. In addition, temperature sensors 11 and 12 are provided adjacent to the microchannel.

In the embodiment of this invention, the microfluid driving element is a pneumatic microflow driving element. Any microflow driving element that can drive a microfluid to move back and forth inside a microchannel at a high switching speed may be used in this invention. A microflow driving system as disclosed in U.S. patent Ser. No. 09/345,451 maybe used in this invention and is thus taken for reference.

According to the present invention, the air gallery 6 is connected with the buffer area 7 of the microchannel and comprises three air ducts 6a, 6b and 6c, which are respectively connected to air jet nozzles 4a, 4b and 4c. At the connection of the air gallery 6 and the buffer area 7 is an expanded triangle gap 6d. Inside the air gallery 6, at the down stream position to the triangle gap 6d from the air ducts 6a, 6b and 6c is a trapezoid block 6c which causes circulation of air in said gallery. When airflow is supplied to the air gallery 6 from air ducts 6a and 6b, due to the function of the triangle gap 6d and the trapezoid block 6e, the microfluid inside the microchannel may be driven to move from the temperature sensing area 9 toward the buffer area 7. When airflow is supplied to the air gallery 6 from air ducts 6b and 6c, due to the pressure of the air flow caused to the buffer area 7, the microfluid inside the microchannel maybe driven to move from the buffer area 7 toward the temperature measuring area 9. When airflow is supplied to the air gallery 6 from air ducts 6a and 6c, the microfluid inside the microchannel may be maintained at its original position. A dual frequency timer 2 is used to control the electromagnetic valve 3, such that the airflow nozzles 4a, 4b and 4c may be opened and closed at a predetermined combination and at a predetermined frequency. As a result, the microfluid inside the microchannel may move back and forth inside the microchannel at a predetermined frequency.

Such a pneumatic microflow driving element may change the directions of movement of the microfluid inside the microchannel at a relatively high speed, and is thus suitable for use in this invention. However, other microfluid driving elements that can provide the same or similar functions may also be used in this invention.

In the embodiment of this invention the heating coil 13 may be made from Pt, Pt alloys or other suitable materials. In addition, other direct or indirect heating elements may also be used in this invention. In some embodiments of this invention, cooling elements may also be used to cool the reactants. As to the temperature sensors 11 and 12, they may be any element that is sensitive to variation of temperature. In general cases, Pt is a suitable material. Other materials that can provide a temperature-sensing function may also be suitable. In some embodiments remote temperature sensing element are used to measure the temperature of the reactants.

In the application of this invention, a certain quantity of reactants is added into the microchannel 9 in the microchip 5 from the reactant inlet 10 such that the reactants fill up the temperature sensing area 9 and the heating area 8 of the microchannel 9. At this stage, the buffer area 7 of the microchannel 9 is empty.

Turn on the air compressor 1. Airflow is supplied from the air compressor 1 through the electromagnetic valve 3 and the airflow nozzles 4a, 4b and 4c to the air gallery 6. Adjust the dual frequency timer 2 to control the operation of the electromagnetic valve 3, such that the airflow nozzles 4a, 4b and 4c switch at a predetermined frequency between the following combinations:

Combination A: Nozzles 4a and 4b are open and 4c is closed. In this combination, the two airflows entering into the air gallery 6 suck the reactants inside the microchannel to move to fill the heating area 8 and the buffer 7 of the microchannel.

Combination B: Nozzle 4a is closed and 4b and 4c are open. In this combination, the two airflows entering into the gallery cause the reactants inside the microchannel to move to fill the temperature sensing area 9 and the heating area 8 of the microchannel.

When the system is switched between combinations A and B, the reactants may move back and forth inside the microchannel. During the movement of the reactants the heating area is always filled with the reactants.

During the movement of the reactants the heating coil 13 is turned on, such that thermal energy may be transmitted to the reactants at a predetermined frequency of movement of the reactants. As a result, adjusting the frequency of movement of the reactants may easily control the temperature of the reactants.

EMBODIMENT

A chip sized 15*30*1 mm is prepared. A fluid channel with the cross-sectional area of 300*300 µm is formed in the chip. 5 µL of pure water with the temperature of 24° C. is added into the fluid channel. Drive the fluid to move back and forth in the fluid channel at frequencies and measure the temperature of the fluid. The result is shown in FIG. 2. FIG. 2 shows the relation between temperature of fluid and frequency of back-and-forth movement of fluid, tested in an embodiment of the device for frequency thermal control of microfluid of this invention.

In this embodiment, temperature sensor 11 is positioned adjacent to the heating coil 13. The temperature measured by sensor 11 represents the temperature of the coil 13. After power-on, the temperature of the coil is maintained at around 53° C. Temperature sensor 12 is not positioned in the heating area 8 to avoid interference by the heating coil 11. During the test the reactants flow over the temperature sensor 12 at all times. Temperature measured by sensor 12 may represent the temperature of the reactants. As shown in this embodiment, after the temperature of the reactants is raised to 53° C., it may be further fine tuned to between 50.59° C. and 53.6° C. by adjusting the frequency of movement of the reactants from 1 to 5 Hz. It is also shown that the higher the frequency, the higher the temperature of the reactants.

In the device for frequency thermal control of microfluid of this invention, a new factor, frequency, is added into the PCR system to control the temperature of the system. This factor enables more adjustable, rapid and accurate control of temperature of reactants.

In this invention, when the reactants are heated by the coil, distribution of temperature and ingredients in the fluid may be maintained in a uniformed situation, since the reactants are moving back and forth in the microchannel at all times. Efficiency of biochemical reactions may be thus enhanced.

When the pneumatic microflow driving element is used, the transient state of the pneumatic effect may be less than 10 microseconds. Frequency of movement of the microfluid may reach about 100 Hz. With the help of high quality micro heating coils, the strict requirements in the PCR process may be satisfied.

As the present invention has been shown and described with reference to preferred embodiments thereof, those skilled in the art will recognize that the above and other changes may be made therein without departing form the spirit and scope of the invention.

What is claimed is:

1. A device for thermal control of microfluid, comprising:
   a microchannel to allow a microfluid to flow inside said microchannel;
   a microfluid back-and-forth movement driving and control element to cause said microfluid to move back-and-forth in said microchannel at a predetermined frequency; and
   at least one heating element, positioned adjacent to said microchannel, to supply thermal energy to said microfluid as said microfluid moves back-and-forth inside said microchannel;
   wherein a temperature of said microfluid is adjusted by adjusting the frequency of said back-and-forth movement of said microfluid.

2. The device according to claim 1 wherein said microfluid back-and-forth movement driving element comprises:
   an airflow supplier to supply stable airflows;
   a pneumatic effects structure to cause said microfluid to move in said channel in response to supply of said airflows;
   at least three nozzles to supply said airflows from said airflow supplier to said pneumatic effects structure and cause said back-and-forth movement of said microfluid in response to opening and closing different ones of said nozzles; and
   a dual frequency timer and electromagnetic valves controlled by said dual frequency timer to control said opening and closing of said at least three airflow nozzles and a frequency of said opening and closing, wherein said frequency of said nozzle opening and closing determines said frequency of said back-and-forth movement of said microfluid, and therefore the temperature of said microfluid.

3. The device according to claim 2 wherein said pneumatic effect structure comprises:
   an air gallery to allow airflows supplied by said nozzles to flow through;
   a triangle gap connecting said air gallery and said microchannel; and
   a trapezoid block positioned in said gallery at a downstream position relative to said triangle gap, to cause air circulation in said air gallery;
   wherein at least one of said at least three nozzles supplies an airflow to said trapezoid block to cause said air circulation.

4. The device according to claim 1 wherein said at least one heating element is positioned at the bottom of said microchannel.

5. The device according to claim 1, further comprising a micro temperature sensor positioned at the bottom of said microchannel.

* * * * *